(12) United States Patent
Nelson

(10) Patent No.: US 6,844,831 B1
(45) Date of Patent: Jan. 18, 2005

(54) SPLIT LATENCY DECODING

(75) Inventor: S. Craig Nelson, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 10/642,864

(22) Filed: Aug. 18, 2003

(51) Int. Cl.[7] .................................................. H03M 7/00
(52) U.S. Cl. ........................................................ 341/50
(58) Field of Search ............................. 341/50, 51, 67, 341/95

(56) References Cited

U.S. PATENT DOCUMENTS 5,872,946 A   2/1999   Narayan et al.
6,272,616 B1 *  8/2001   Fernando et al. ............. 712/20
6,546,478 B1   4/2003   Keller et al.

* cited by examiner

*Primary Examiner*—Brian Young
(74) *Attorney, Agent, or Firm*—Lawrence J. Merkel; Meyertons, Hood, Kivlin, Kowert & Goetzel, P.C.

(57) ABSTRACT

A decode unit is coupled to receive instruction bytes and to dispatch instructions to an execution subsystem. The decode unit comprises circuitry divided into a pipeline including a plurality of pipeline stages, wherein the circuitry is configured to concurrently initiate decode of a plurality of instructions and to dispatch at least an initial instruction of the plurality of instructions from a first pipeline stage of the plurality of pipeline stages. Furthermore, the circuitry is configured to dispatch at least one remaining instruction of the plurality of instructions from a second pipeline stage of the plurality of pipeline stages. The second pipeline stage is subsequent to the first pipeline stage in the pipeline.

31 Claims, 6 Drawing Sheets

SPLIT LATENCY DECODING

BACKGROUND OF THE INVENTION

1. Field of the Invention

This invention is related to the field of processors and, more particularly, to instruction decoding in processors.

2. Description of the Related Art

Processors often attempt to decode multiple instructions per clock cycle in order to provide high performance instruction execution (e.g. to supply superscalar execution resources). Often, the decoding of multiple instructions complicates the decoding process, and thus may lengthen the decode latency. The decode latency may be of particular concern when a control transfer occurs (e.g. a branch instruction or other instruction which redirects fetching from a sequential execution path to another address). A new fetch address is generated in response to executing a control transfer instruction, and the next instruction to be executed does not reach the execution resources until the decode latency has expired.

Decoding multiple instructions per clock cycle may increase the decode latency, for example, if the instruction set specifies variable length instructions. The instructions in a sequential code sequence are stored in consecutive bytes of memory. With variable length instructions, the initial instruction in a sequential code sequence generally must be decoded enough to determine its length in order to locate the start of the next instruction. The serial process of locating instructions may increase the decode latency. Some processors implement predecode data (e.g. a start bit and/or end bit associated with each byte that indicates if the byte is a start or end of an instruction) to simplify the process of locating multiple instructions in a decoder. However, even with the predecode data, locating the initial instruction is quicker than locating subsequent instructions. The location of the initial instruction is indicated by a start pointer provided with the instruction bytes. To locate other instructions, the decode unit must process the predecode data (or decode the initial instruction, if predecoding is not implemented). After locating one or more other instructions, the decode unit may update the start pointer to point to the next byte after the last located instruction and may update the predecode data to mask out the located instructions. The update permits, in a subsequent clock cycle, locating additional instructions within the set of instruction bytes. However, this feedback process may set on upper bound on the maximum operating frequency of the decode unit.

In some previous processors (e.g. the AMD Athlon™ line of processors available from Advanced Micro Devices, Inc., Sunnyvale, Calif.), the decode unit decodes multiple instructions per clock cycle. The decode unit operates over several pipeline stages, and multiple instructions move through the decode unit in synchronization. The multiple instructions exit the decode unit to the execution circuitry at the same time (i.e. in the same clock cycle). In such a processor, the above feedback process may either limit the operating frequency of the decode unit or may increase the decode latency.

SUMMARY OF THE INVENTION

In one embodiment, a decode unit is coupled to receive instruction bytes and to dispatch instructions to an execution subsystem. The decode unit comprises circuitry divided into a pipeline including a plurality of pipeline stages, wherein the circuitry is configured to concurrently initiate decode of a plurality of instructions and to dispatch at least an initial instruction of the plurality of instructions from a first pipeline stage of the plurality of pipeline stages. Furthermore, the circuitry is configured to dispatch at least one remaining instruction of the plurality of instructions from a second pipeline stage of the plurality of pipeline stages. The second pipeline stage is subsequent to the first pipeline stage in the pipeline.

In another embodiment, a decode unit is coupled to receive instruction bytes and to dispatch instructions into a plurality of positions input to an execution subsystem. The plurality of positions are indicative, to the execution subsystem, of a program order of instructions concurrently dispatched into the plurality of positions. The decode unit is configured to concurrently initiate decode of a plurality of instructions, to decode one or more initial instructions of the plurality of instructions with a first decode latency, and to decode at least one remaining instruction with a second decode latency. The decode unit is configured to dispatch the one or more initial instructions into one or more last positions of the plurality of positions and to dispatch the remaining instruction into a different one of the plurality of positions. The last positions are ordered subsequent to each of the other positions of the plurality of positions.

BRIEF DESCRIPTION OF THE DRAWINGS

The following detailed description makes reference to the accompanying drawings, which are now briefly described.

Figure 1:
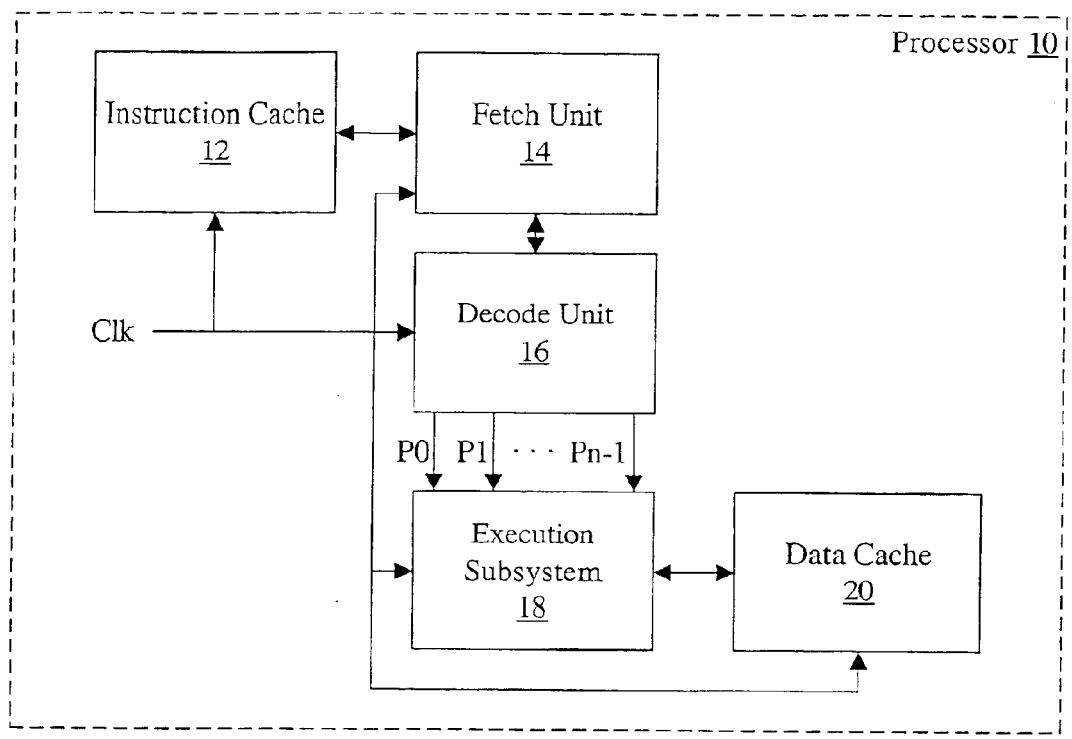
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a processor 10 is shown. In the illustrated embodiment, the processor 10 includes an instruction cache 12, a fetch unit 14, a decode unit 16, an execution subsystem 18, and a data cache 20. The fetch unit 14 is coupled to the instruction cache 12 and the decode unit 16. The decode unit 16 is coupled to dispatch instructions to the execution subsystem 18. More particularly, the decode unit 16 is coupled to dispatch instructions to a plurality of positions (P0 to Pn−1 in FIG. 1) that are input to the execution subsystem 18. The execution subsystem 18 is coupled to a data cache 20. Each of the instruction cache 12, the fetch unit 14, the decode unit 16, the execution subsystem 18, and the data cache 20 may be clocked by a clock signal (Clk in FIG. 1).

Generally, the fetch unit 14 is configured to fetch instructions from the instruction cache 12 (or, in the event of a miss in the instruction cache 12, from other caches in the cache hierarchy, if applicable, or from external memory, not shown in FIG. 1). The fetch unit 14 may include various circuitry to aid in the fetching of instructions (e.g. a branch prediction unit to predict branch instructions). The fetch unit 14 may be coupled to the execution subsystem 18 to receive a redirection of fetching (e.g. in response to an exception or branch misprediction). In some embodiments, the fetch unit 14 may fetch both instruction bytes and corresponding predecode data from the instruction cache 12 and provide the instruction bytes and predecode data to the decode unit 16. The instruction bytes may represent one or more instructions to be executed by the processor 10. In one embodiment, the instructions may be variable length (that is, various instructions may occupy differing numbers of bytes). For example, in one implementation the processor 10 may implement the x86 instruction set (also referred to as the IA-32 instruction set). The instruction cache 12 may be a high speed cache memory for storing instructions (and optionally storing predecode data as well). The instruction cache 12 may have any organization (e.g. set associative, direct mapped, fully associative, etc.).

The decode unit 16 is coupled to receive the instruction bytes representing one or more instructions (and optionally the corresponding predecode data) and is configured to decode the instructions for dispatch to the execution subsystem 18. More particularly, the decode unit 16 is configured to concurrently initiate decode of a plurality of instructions within the received instruction bytes and is configured to dispatch the plurality of instructions to the execution subsystem 18. The number of the plurality of instructions on which the decode unit 16 may concurrently initiate decoding may be referred to as the "width" of the decode unit 16. For example, a width of 2 indicates that the decode unit 16 may initiate decode on up to 2 instructions concurrently. A width of 3 indicates that the decode unit 16 may initiate decode on up to 3 instructions concurrently. Generally, decoding an instruction may comprising processing at least some of the bits/bytes that form the instruction to detect one or more properties of the instruction (e.g. one or more of the type of instruction, which instruction is specified, operands of the instruction, other instruction options, etc.).

The decode unit 16 may implement circuitry to perform the decoding of the plurality of instructions. The circuitry may be divided into a pipeline comprising a plurality of pipeline stages and clocked by the clock signal Clk. The decode unit 16 may dispatch at least the initial instruction of the plurality of instructions from a first pipeline stage of the plurality of pipeline stages to the execution subsystem 18, and may dispatch the remaining instructions from a second pipeline stage subsequent to the first stage in the pipeline. The second pipeline stage may be the last pipeline stage of the pipeline, in some embodiments. Even though the decode unit 16 initiates decode of the initial instruction and the remaining instructions concurrently, the initial instruction may be dispatched earlier than the remaining instructions. Thus, the effective decode latency may be reduced. For example, if the decode unit 16 were to implement a four stage pipeline and the initial instruction is dispatched from the pipeline stage 3, the effective decode latency would be 3.5 clock cycles of the clock signal Clk if the width of the decode unit 16 were two (i.e. the average of 3 clock cycles for the initial instruction and 4 clock cycles for the remaining instruction). If the decode unit 16 has a width of three, the effective decode latency may be approximately 3.67 clock cycles (i.e. the average of 3 clock cycles for the initial instruction and 4 clock cycles for the remaining two instructions). In other embodiments, some of the remaining instructions may be dispatched from the second pipeline stage, and other ones of the remaining instructions may be dispatched in one or more pipeline stages subsequent to the second pipeline stage in the pipeline. In still other embodiments, the decode unit 16 may dispatch two or more initial instructions with a lower latency than remaining instructions.

The effective decode latency may be a factor in the performance of the processor 10 in response to control transfers such as branch instructions, exceptions, etc. The initial instructions fetched in response to the control transfer may not be available for execution until the decode latency expires, and thus reducing the decode latency may improve performance.

An embodiment implementing variable length instructions is next described. In such an embodiment, the decode unit 16 may detect the initial instruction in the plurality of variable length instructions rapidly (e.g. the start of the instruction is indicated via a value in a register such as a start pointer), and may decode the initial instruction with a lower latency that remaining instructions (which are detected by scanning the predecode data, if provided, or by decoding each instruction enough to determine its end, and thus the beginning of the next instruction). That is, the decode unit 16 may overlap the beginning of decoding the initial instruction with the location of the remaining instructions. In other embodiments, the decode unit 16 may detect two or more initial instructions rapidly and may overlap the beginning of decoding the two or more initial instructions with the location of the remaining instructions. The variable length instruction embodiment will be used as an example in the remainder of this discussion, although other embodiments may implement fixed length instructions.

Figure 3:
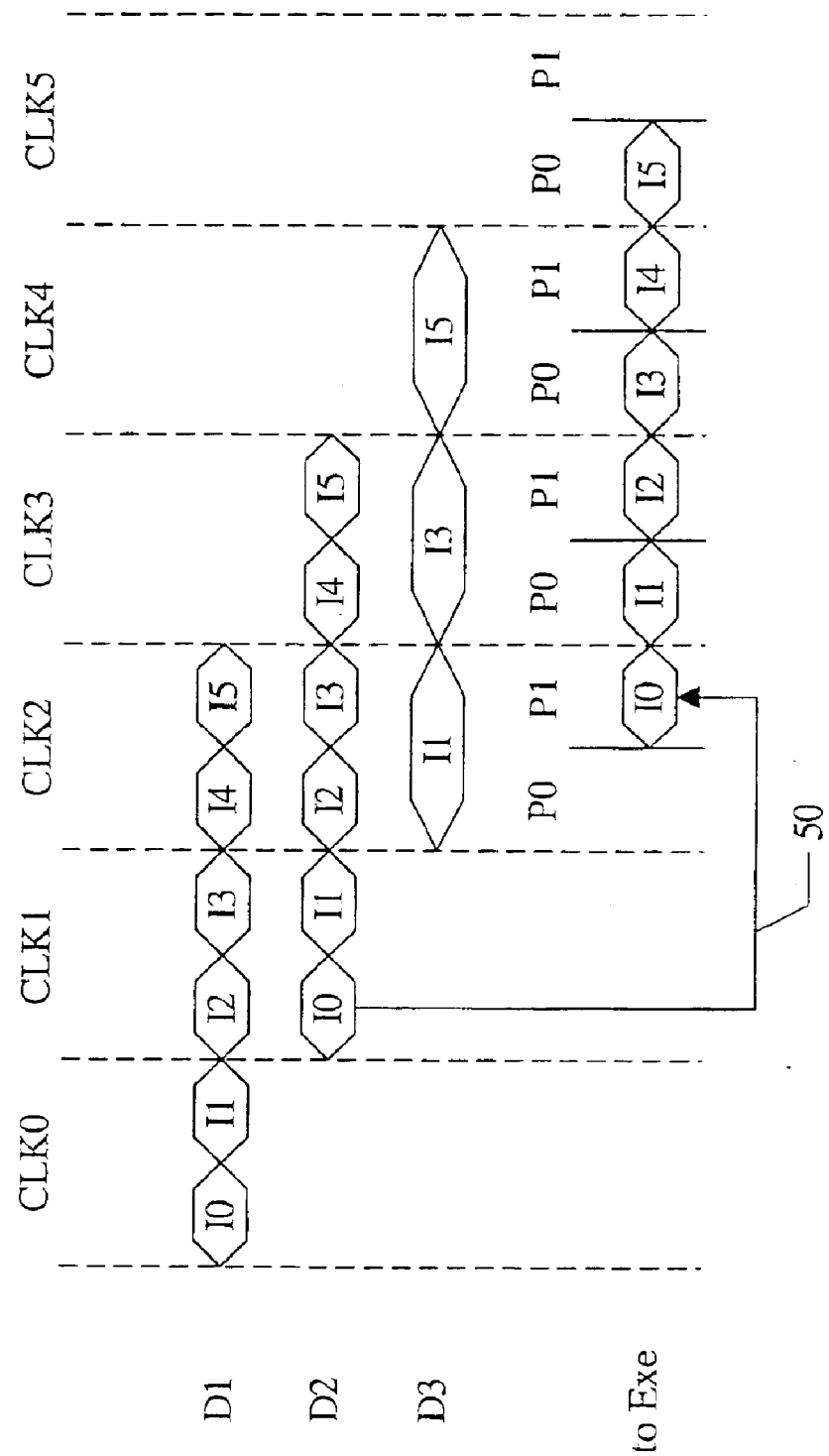
FIG. 3 is a timing diagram illustrating operation of one embodiment of the decode unit shown in FIG. 2.
Figure 4:
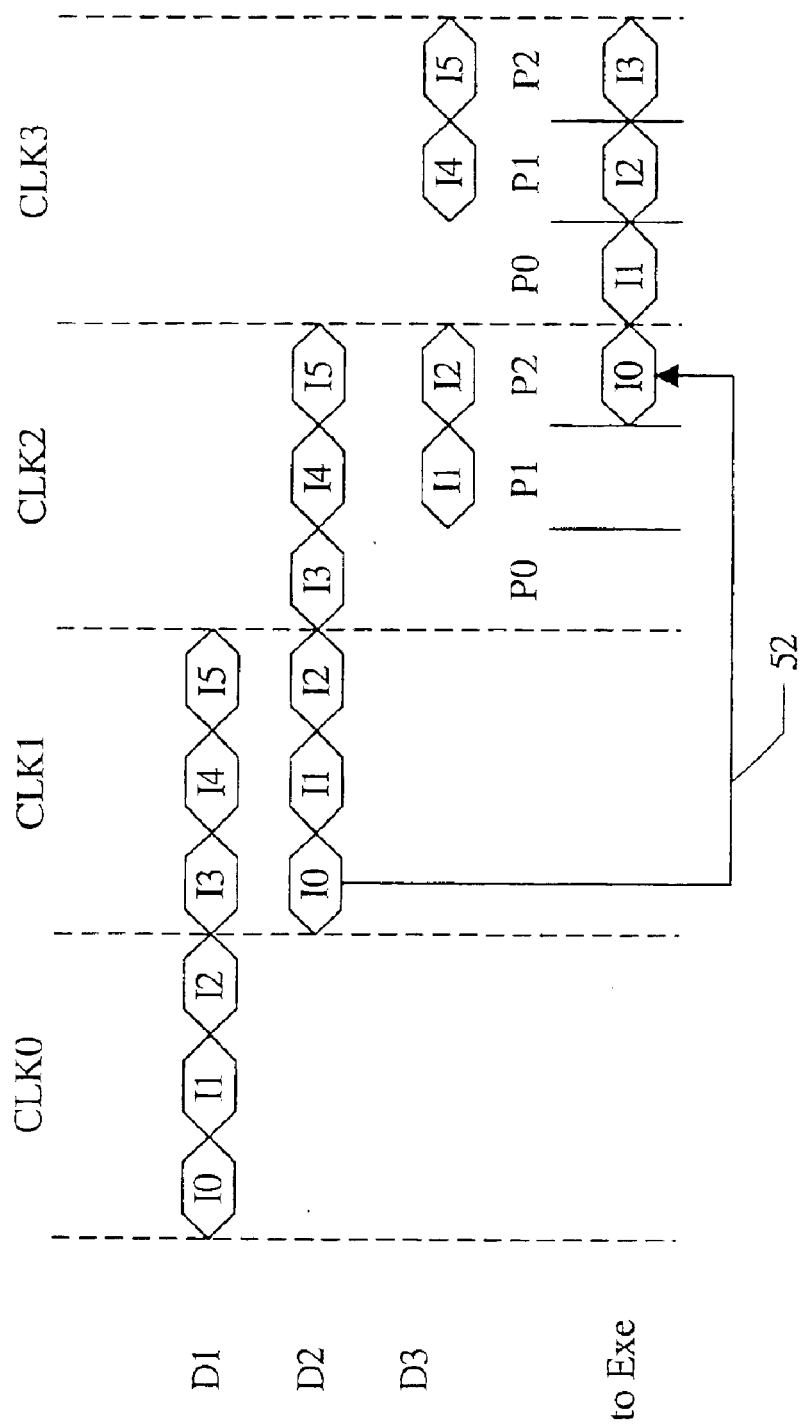
FIG. 4 is a timing diagram illustrating operation of a second embodiment of the decode unit shown in FIG. 2.

As mentioned above, the decode unit 16 may dispatch instructions into a plurality of positions P0 to Pn−1 input to the execution subsystem 18. That is, up to N instructions may be dispatched concurrently into positions P0 to Pn−1, wherein N is an integer. Accordingly, the decode unit 16 may also concurrently initiate decode of up to N instructions as well. The execution subsystem 18 may interpret the positions P0 to Pn−1 as an indication of the program order of the instructions that are concurrently dispatched into the positions P0 to Pn−1. That is, the instruction in the P0 position may be prior, in program order, to an instruction concurrently in the P1 position, which may itself be prior to an instruction concurrently in the P2 position, etc. In such an embodiment, the decode unit 16 may dispatch the initial instruction or instructions into the last position or positions (e.g. Pn−1, Pn−2, etc.). The remaining instructions may be dispatched (in the subsequent clock cycle), into the initial positions. In this fashion, the initial instruction or instructions may be dispatched concurrently with the remaining instructions of a previous plurality of instructions on which decode was concurrently initiated, and program order may be maintained. The timing diagrams of FIGS. 3 and 4 illustrate this effect in more detail.

The execution subsystem 18 generally includes the circuitry for executing instructions. The execution subsystem 18 may have any configuration. For example, the execution subsystem 18 may be superscalar, executing multiple instructions in parallel. Alternatively, the execution subsystem 18 may be scalar. The execution subsystem 18 may, in various embodiments, execute instructions in program order or out of order. The execution subsystem 18, in embodiments which execute out of order, may include the various resources included to ensure correct results and/or improve performance (e.g. reorder buffers or schedulers for implementing register renaming, reservation stations, etc.). The execution subsystem 18 may be coupled to the data cache 20 to read/write data in response to load/store memory operations. The data cache 20 may be a high speed cache memory, and may have any configuration (e.g. set associative, direct-mapped, fully associative, etc.).

As mentioned above, the instruction cache 12, the fetch unit 14, the decode unit 16, the execution subsystem 18, and the data cache 20 may be clocked by a clock signal Clk. That is, the pipeline stages in the pipelines implemented in the fetch unit 14, the decode unit 16 and the execution subsystem 18 may be clocked by the clock signal Clk. Additionally, various timing circuitry in the caches 12 and 20 may be clocked by the clock signal Clk. The clock signal Clk may be internally generated from an external clock reference signal (e.g. using a phase locked loop (PLL) or other clock generation circuitry). Alternatively, the clock signal Clk may be provided from an external source (e.g. a pin to the processor 10).

The above description refers to a pipeline stage of the decode pipeline being subsequent to another pipeline stage of the decode pipeline. Generally, a pipeline stage may be subsequent to another pipeline stage if that pipeline stage operates on a given instruction at a later clock cycle than the other pipeline stage. Additionally, the above description refers to concurrently initiating decode of a plurality of instructions. As used herein, decode may be concurrently initiated if the decode is initiated within the same clock cycle. Additionally, as used herein, the program order of instructions may be the order of the instructions as listed in the program that includes the instructions.

Figure 2:
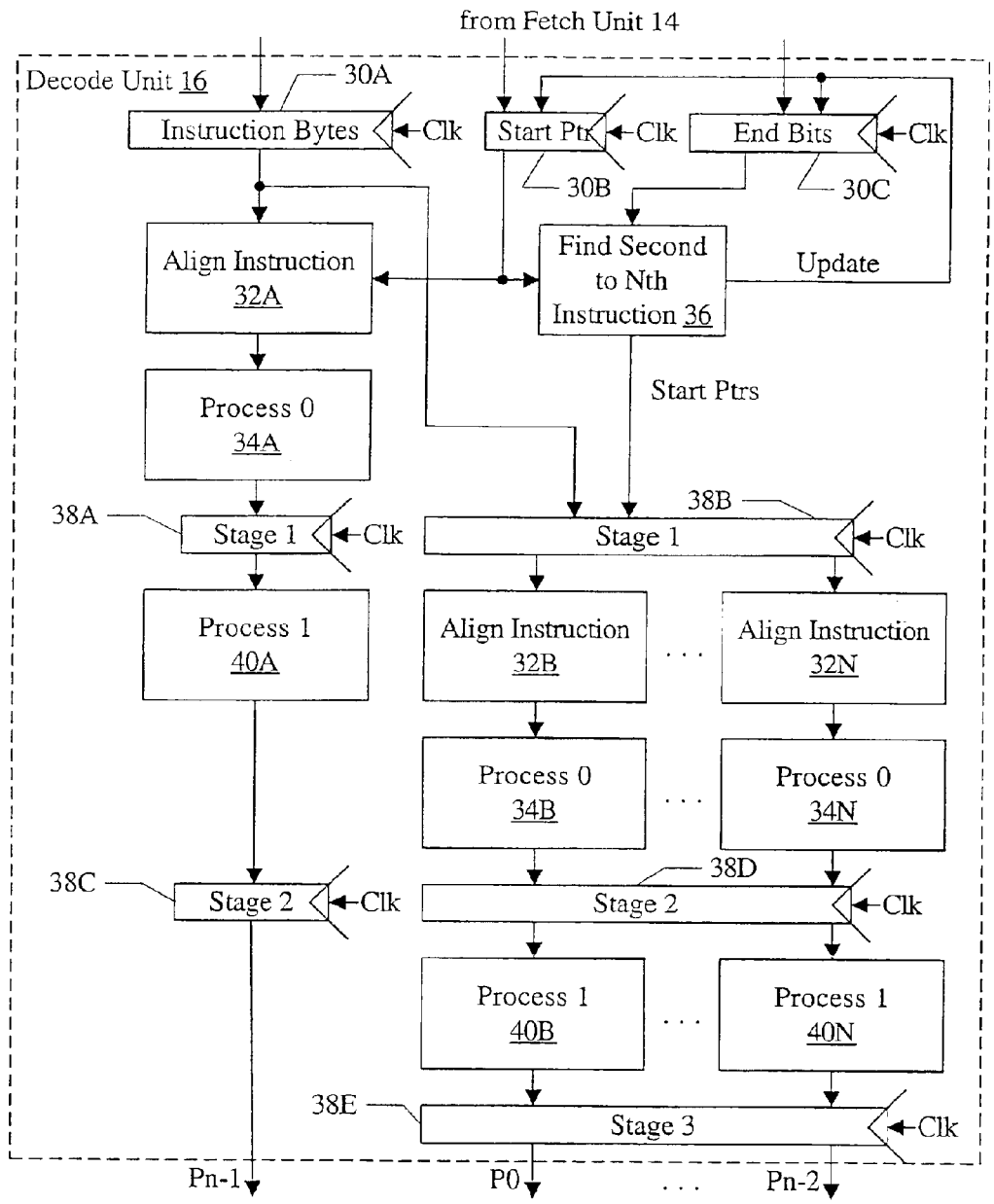
FIG. 2 is a block diagram of one embodiment of a decode unit shown in FIG. 1

Turning now to FIG. 2, a block diagram of one embodiment of the decode unit 16 is shown. In the illustrated embodiment, the decode unit 16 includes an instruction buffer comprising an instruction bytes buffer 30A, a start pointer buffer 30B, and an end bits buffer 30C. The instruction bytes buffer 30A, the start pointer buffer 30B, and the end bits buffer 30C are coupled to receive instruction bytes, a start pointer, and end bits from the fetch unit 14, respectively. Coupled to the instruction bytes buffer 30A and the start pointer buffer 30B is an align instruction circuit 32A, which is further coupled to a process 0 circuit 34A. The process 0 circuit 34A is coupled to a clocked storage device 38A. Coupled to the start pointer buffer 30B and the end bits buffer 30C is a find second to Nth instruction circuit 36, which is coupled to provide one or more start pointers to a clocked storage device 38B. The clocked storage device 38B is further coupled to the instruction bytes buffer 30A. The clocked storage device 38A is coupled to a process 1 circuit 40A, which is further coupled to a clocked storage device 38C. The clocked storage device 38C is coupled to position Pn−1. The clocked storage device 38B is coupled to align instruction circuits 32B–32N, which are coupled to respective process 0 circuits 34B–34N. The process 0 circuits 34B–34N are coupled to a clocked storage device 38D, which is further coupled to process 1 circuits 40B–40N. The process 1 circuits 40B–40N are coupled to a clocked storage device 38E, which is coupled to the positions P0 to Pn−2. The clocked storage devices 38A–38E are clocked by the clock signal Clk.

The fetch unit 14 may provide a plurality of instruction bytes, a start pointer, and a plurality of end bits to the instruction buffer for storage in response to a fetch. The start pointer may indicate which byte of the instruction bytes is the initial byte of the fetch. For example, the instruction bytes may be a cache line (or a portion of a cache line). However, the fetch may have actually been located within the cache line (e.g. if the fetch is for the target address of a branch). Thus, some of the initial bytes may not actually be part of the instruction bytes that are to be decoded and executed. The end bits may comprise predecode data in this embodiment. For example, there is an end bit for each instruction byte. If the end bit is set, the corresponding byte is an end of an instruction.

In the illustrated embodiment, the decode unit 16 is configured to concurrently initiate decode of up to N instructions from the instruction buffer (where N is an integer greater than one). In this embodiment, the initial instruction is dispatched from a first pipeline stage and the subsequent instructions are dispatched from a subsequent second pipeline stage. The pipeline stages are delimited, in FIG. 2, by the clocked storage devices 38A–38E. Thus, in this embodiment, the decode unit 14 may implement a three stage pipeline. In stage 1, the initial instruction is aligned and processing of the initial instruction is started while the remaining instructions are located by processing the predecode data. In stage 2, the initial instruction's decode is completed and the remaining instructions are aligned to respective circuitry that begins processing the remaining instructions. In stage 3, the remaining instructions' decodes are completed.

The operation of the align instruction circuit 32A, the process 0 circuit 34A, and the process 1 circuit 40A will next be described. The align instruction circuit 32A is coupled to receive the instruction bytes from the instruction bytes buffer 30A, and aligns the initial instruction to the process 0 circuit 34A for processing. The start pointer may indicate any byte within the instruction bytes, and the align instruction circuit 32A may select that byte as the initial byte to provide to the process 0 circuit 34A. A number of additional bytes subsequent to the initial byte within the instruction bytes are also selected and provided to the process 0 circuit 34A. In some embodiments, certain instruction bytes may be aligned to specific subcircuits in the process 0 circuit 34A (e.g. an opcode byte may be aligned to opcode decode circuitry). Such embodiments may include additional predecode data to identify the bytes to be aligned to the subcircuits.

The process 0 circuit 34A begins the processing of the instruction represented by the selected bytes. For example, in one embodiment implementing the x86 instruction set, the process 0 circuit 34A may process one or more prefix bytes that may precede the opcode byte in an x86 instruction. Additionally, the processing of the opcode byte, the opcode extension byte (if included), the register/memory (MOD R/M) byte (if included), and the scale-index-base (SIB) byte (if included) may be started. The process 1 circuit 40A receives the output of the process 0 circuit 34A (through the clocked storage device 38A) and completes the decoding of the instruction. The decoded instruction is then dispatched into the position Pn−1 (through the clocked storage device 38C).

In parallel with the operation of the align instruction circuit 32A and the process 0 circuit 34A, the find second to Nth instruction circuit 36 may scan the predecode data (the end bits, in this example) to locate the second through the Nth instructions in the instruction bytes. Beginning at the start pointer and scanning the end bits, the first end bit that is set indicates the end of the initial instruction, the second end bit indicates the end of the next instruction, etc. Thus, the find second to Nth instruction circuit 36 may generate start pointers (similar to the start pointer in the start pointer buffer 30B) for each of the second to Nth instructions (or up to the Nth instruction, since not all sets of instruction bytes may include N instructions). The instruction bytes from the instruction bytes buffer 30A may also be pipelined down to stage 2 (illustrated in FIG. 2 as the connection between the instruction bytes buffer 30A and the clocked storage device 38B).

The align instruction circuits 32B–32N may operate in the same fashion as the align instruction circuit 32A, during stage 2. Each of the align circuits 32B–32N may receive one of the start pointers generated by the find second to Nth instruction circuit 36 and the instruction bytes pipelined down to stage 2, and may align the corresponding instruction to the respective process 0 circuits 34B–34N. Similarly, the process 0 circuits 34B–34N may operate in the same fashion as the process 0 circuit 34A on the respective instructions, and the process 1 circuits 40B–40N may operate in the same fashion as the process 1 circuit 40A on the respective instructions. Thus, at each pipeline stage in the decode unit 16 pipeline, the remaining instructions may be processed in the same fashion as the initial instruction was processed in the preceding pipeline stage.

In addition to locating the second to the Nth instruction, the find second to Nth instruction circuit 36 may generate an update for the start pointer buffer 30B and the end bits buffer 30C. The start pointer may be updated to point to the next byte after the end of the Nth instruction, and the end bits may be updated to mask (e.g. clear) the end bits corresponding to the second to Nth instructions. These updates may permit the location of additional instructions in the instruction bytes (if more than N instructions are included). If the instruction bytes have been exhausted, the instruction buffer may instead update from the fetch unit 14 with the next fetched set of instruction bytes, start pointer, and predecode data.

It is noted that, while end bits are used as the predecode data in this embodiment, other embodiments may use any predecode data. For example, the predecode data may comprise a start bit for each byte, indicating whether or not that byte is the start of an instruction. Other embodiments may encode one or more pointers to instructions, instruction lengths, etc. It is noted that the number of pipeline stages shown in FIG. 2 is merely exemplary, and more or fewer pipeline stages may be used in other embodiments. Furthermore, the division of functionality among the pipeline stages may be varied as desired.

Various embodiments of the decode unit 16 may concurrently initiate decode of any number of instructions. That is, N may be any number greater than one.

Generally, the clocked storage devices 38A–38E may be any sort of storage device (e.g. registers, flops, latches, etc.) which captures an input value responsive to a clock signal (e.g. clock signal Clk) and provides the input as an output. While the clocked storage devices 38A–38E are shown to delimit pipeline stages in this embodiment, other embodiments may include additional storage devices (e.g. PH1/PH2 latch designs). It is further noted that, in some embodiments, the devices 38C and 38E may be eliminated and instead the execution subsystem 18 may capture the outputs of the process 1 circuits 40A–40N.

Turning now to FIG. 3, a timing diagram is shown illustrating operation of one embodiment of the decode unit 16 which concurrently initiates decode of up to 2 instructions. Clock cycles of the clock signal Clk are shown as CLK0, CLK1, CLK2, CLK3, CLK4, and CLK5. The clock cycles are delimited by vertical dashed lines. The pipeline stages of the decode unit 16 are labeled D1 (decode stage 1), D2 (decode stage 2), and D3 (decode stage 3). A consecutive set of instructions I0 through I5 are shown. That is, instruction I0 is the initial instruction in program order, instruction I1 is the next instruction after instruction I0 in program order, instruction I2 is the next instruction after instruction I1 in program order; etc.

In clock cycle CLK0, the decode unit 16 initiates decode for the instructions I0 and I1. Particularly, the instruction I0 is aligned to the process 0 circuit 34A and the instruction I1 is located via the predecode data. In clock cycle CLK1, the instructions I0 and I1 move to decode stage 2. The instruction I0 completes decode in clock cycle CLK1, and is dispatched into position P1 in clock cycle CLK2 (arrow 50). That is, the instruction I0 dispatches into the last position (P1) even though the instruction is the initial instruction in program order. On the other hand, the instruction I1 proceeds to decode stage 3 in clock cycle CLK2, and completes decode.

In clock cycle CLK1, the decode unit 16 also initiates decode for the instructions I2 and I3. In clock cycle CLK2, the instructions I2 and I3 proceed to decode stage 2 and the instruction I2 completes decode. Accordingly, the instructions I2 and I1 are dispatched to the execution subsystem 18 in clock cycle CLK3, with the instruction I1 in the position P0 and the instruction I2 in the position P1 (similar to the instruction I0 being dispatched into the position P1 as illustrated by arrow 50). Thus, the effect of dispatching the initial instruction on the last position (P1 in this case) in maintaining the program order to the execution subsystem 18 is illustrated. Instruction I1 precedes the instruction I2 in program order, and this is indicated by dispatching instruction I1 concurrently with instruction I2 (whose decode is initiated later than instruction I1) and having instruction I1 in a position that indicates that instruction I2 is subsequent to instruction I1 in program order.

In clock cycle CLK2, the decode unit also initiates decode for the instructions I4 and I5, and the instructions move to decode stage 2 in clock cycle CLK3. In clock cycle CLK4, the instruction I4 is dispatched into position P1 (along with the instruction I3 dispatched into position P0). In clock cycle CLK5, the instruction I5 is dispatched into position P0.

FIG. 4 is a timing diagram illustrating operation of one embodiment of the decode unit 16 which concurrently initiates decode of up to 3 instructions. Clock cycles of the clock signal Clk are shown as CLK0, CLK1, CLK2, and CLK3. The clock cycles are delimited by vertical dashed lines. The pipeline stages of the decode unit 16 are labeled D1, D2, and D3, similar to FIG. 3. A consecutive set of instructions I0 through I5 are shown.

In clock cycle CLK0, the decode unit 16 initiates decode for the instructions I0, I1, and I2. Particularly, the instruction I0 is aligned to the process 0 circuit 34A and the instructions I1 and I2 are located via the predecode data. In clock cycle CLK1, the instructions I0, I1 and I2 move to decode stage 2. The instruction I0 completes decode in clock cycle CLK1, and is dispatched into position P2 in clock cycle CLK2 (arrow 52). That is, the instruction I0 dispatches into the last position (P2) even though the instruction is the initial instruction in program order. On the other hand, the instructions I1 and I2 proceed to decode stage 3 in clock cycle CLK2, and complete decode.

In clock cycle CLK1, the decode unit 16 also initiates decode for the instructions I3, I4, and I5. In clock cycle CLK2, the instructions I3, I4, and I5 proceed to decode stage 2 and the instruction I3 completes decode. Accordingly, the instructions I1, I2, and I3 are dispatched to the execution subsystem 18 in clock cycle CLK3, with the instruction I1 in the position P0, the instruction I2 in the position P1, and the instruction I3 in the position P2 (similar to the instruction I0 being dispatched into the position P2 as illustrated by arrow 52). Thus, the effect of dispatching the initial instruction on the last position (P2 in this case) in maintaining the program order to the execution subsystem 18 is again illustrated. Instructions I1 and I2 precede the instruction I3 in program order, and this is indicated by dispatching instructions I1 and I2 concurrently with instruction I3 and having instructions I1 and I2 in a position that indicates that instructions I1 and I2 are prior to instruction I3 in program order.

It is noted that, while FIGS. 2–4 illustrate dispatching one initial instruction prior to dispatching the remaining instructions, other embodiments may dispatch multiple initial instructions prior to dispatching the remaining instructions. In such embodiments, the multiple initial instructions may be dispatched into a plurality of the last positions. For example, if two initial instructions (e.g. I0 and I1) were dispatched, the instruction I0 would be dispatched into position Pn-2 and the instruction I1 would be dispatched into position Pn-1. The remaining instructions would subsequently be dispatched into positions P0 to Pn-3.

Computer Systems

Figure 5:
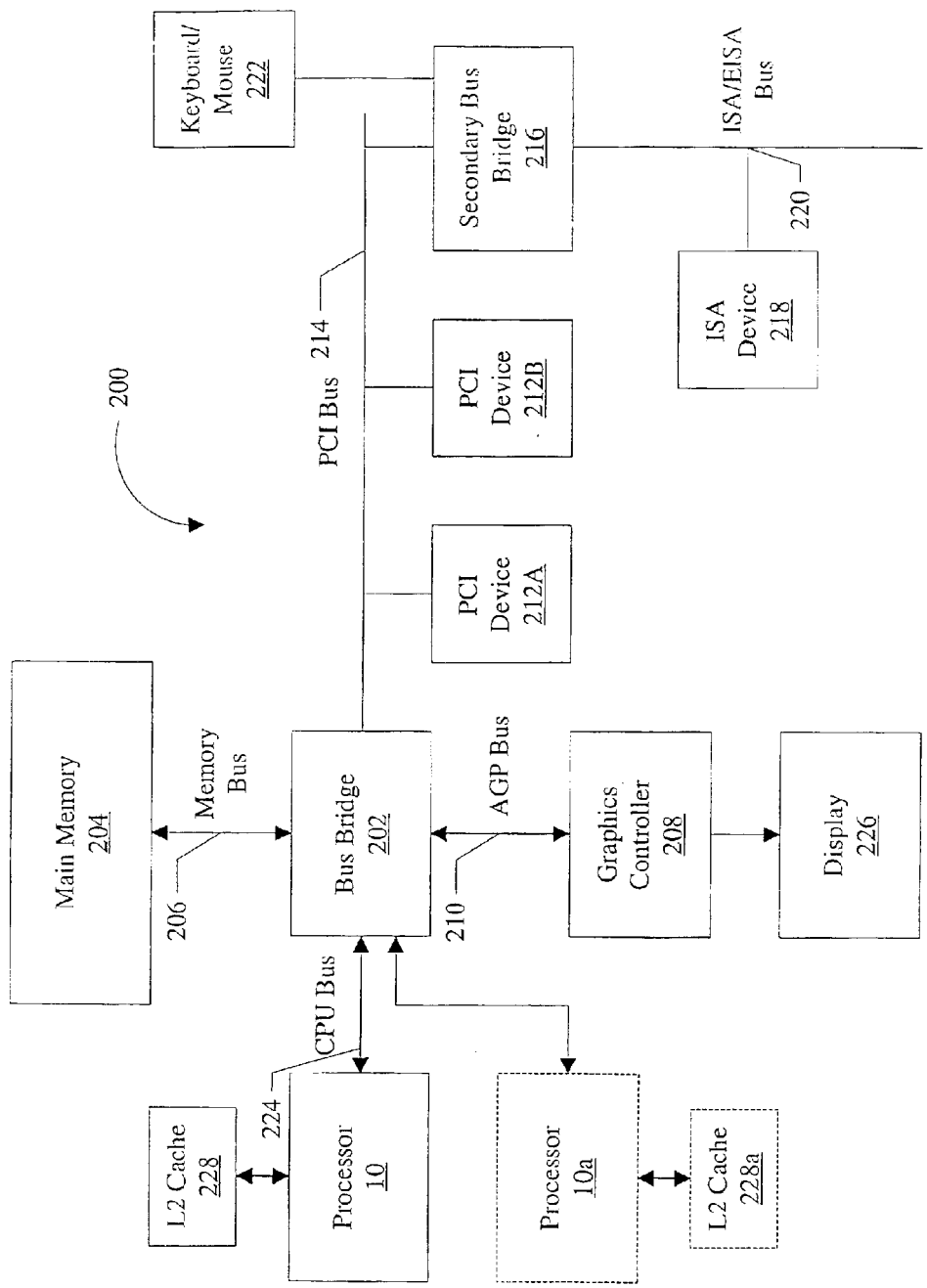
FIG. 5 is a block diagram of one embodiment of a computer system including one or more processors shown in FIG. 1.

Turning now to FIG. 5, a block diagram of one embodiment of a computer system 200 including processor 10 coupled to a variety of system components through a bus bridge 202 is shown. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise an external interface to which external interface unit 18 may couple. The processor 10 may be the processor 10 shown in FIG. 1, and may include the structural and operational details shown in FIGS. 2–4.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM), double data rate (DDR) SDRAM, or Rambus DRAM (RDRAM) may be suitable.

PCI devices 212A–212B are illustrative of a variety of peripheral devices. The peripheral devices may include devices for communicating with another computer system to which the devices may be coupled (e.g. network interface cards, modems, etc.). Additionally, peripheral devices may include other devices, such as, for example, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 5) or may share CPU bus 224 with processor 10. Furthermore, processor 10a may be coupled to an optional L2 cache 228a similar to L2 cache 228.

Figure 6:
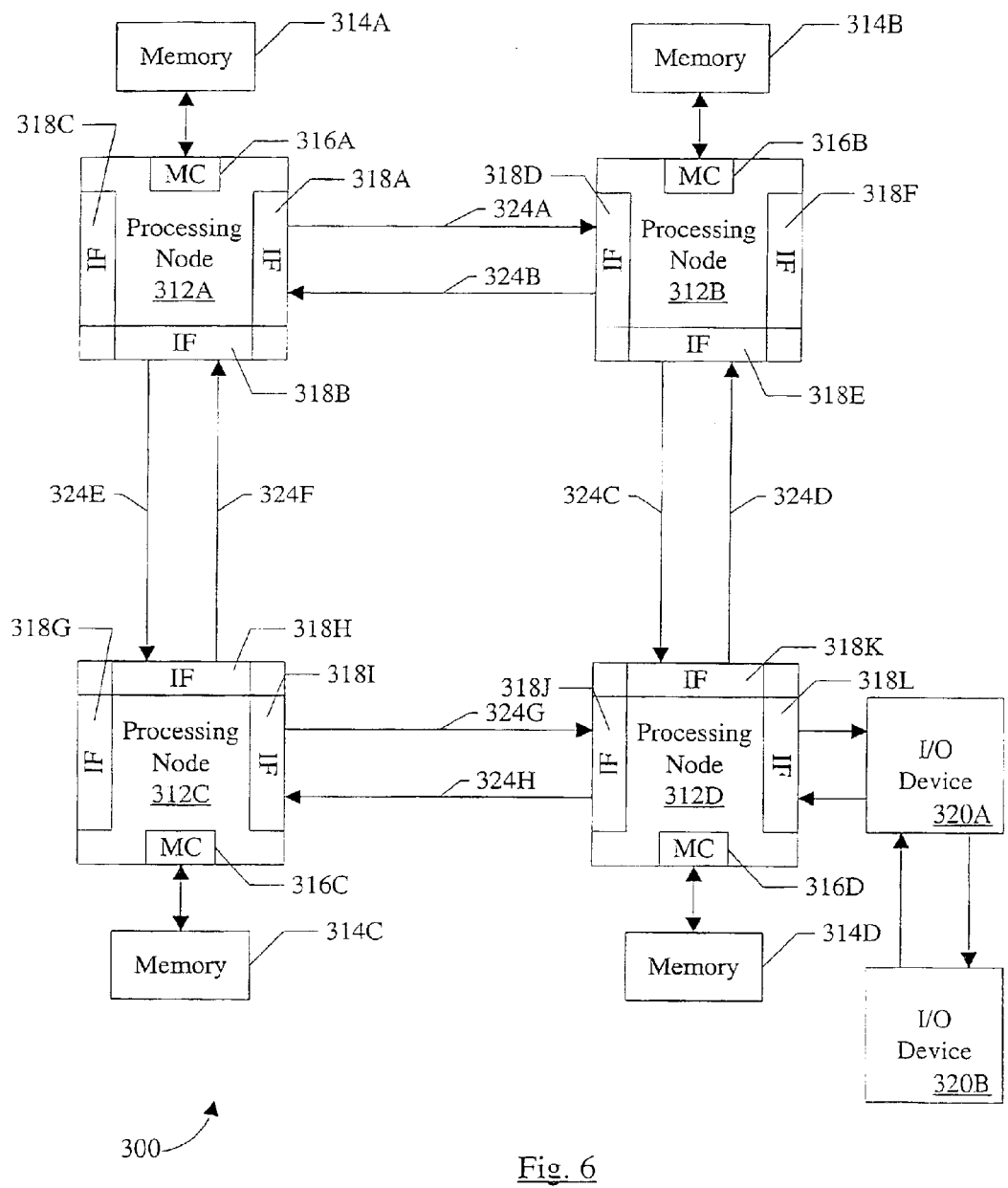
FIG. 6 is a block diagram of a second embodiment of a computer system including one or more processors shown in FIG. 1.

Turning now to FIG. 6, another embodiment of a computer system 300 is shown. In the embodiment of FIG. 6, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 6. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 6. Any suitable routing algorithm may be used. Other embodiments of computer system 300 may include more or fewer processing nodes then the embodiment shown in FIG. 6.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, each processing node 312A–312D may comprise one or more copies of processor 10 as shown in FIG. 1 (e.g. including various structural and operational details shown in FIGS. 2–4). External interface unit 18 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), DDR SDRAM, static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include devices for communicating with another computer system to which the devices may be coupled (e.g. network interface cards or modems). Furthermore, I/O devices 320A–320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

Numerous variations and modifications will become apparent to those skilled in the art once the above disclosure is fully appreciated. It is intended that the following claims be interpreted to embrace all such variations and modifications.

What is claimed is:

1. A decode unit coupled to receive instruction bytes, the decode unit coupled to dispatch instructions to an execution subsystem, wherein the decode unit comprises circuitry divided into a pipeline including a plurality of pipeline stages, the circuitry configured to concurrently initiate decode of a plurality of instructions having a program order with respect to each other, wherein the circuitry is configured to dispatch at least an initial instruction of the plurality of instructions from a first pipeline stage of the plurality of pipeline stages, and wherein the circuitry is configured to dispatch at least one remaining instruction of the plurality of instructions from a second pipeline stage of the plurality of pipeline stages, and wherein the second pipeline stage is subsequent to the first pipeline stage in the pipeline.

2. The decode unit as recited in claim 1 wherein the circuitry is configured to dispatch each remaining instruction of the plurality of instructions from the second pipeline stage.

3. The decode unit as recited in claim 2 wherein the second pipeline stage is a last stage of the pipeline.

4. A decode unit coupled to receive instruction bytes, the decode unit coupled to dispatch instructions to an execution subsystem, wherein the decode unit comprises circuitry divided into a pipeline including a plurality of pipeline stages, the circuitry configured to concurrently initiate decode of a plurality of instructions, wherein the circuitry is configured to dispatch at least an initial instruction of the plurality of instructions from a first pipeline stage of the plurality of pipeline stages, and wherein the circuitry is configured to dispatch at least one remaining instruction of the plurality of instructions from a second pipeline stare of the plurality of pipeline stages, and wherein the second pipeline stage is subsequent to the first pipeline stage in the pipeline, and wherein the decode unit is configured to dispatch instructions into a plurality of positions input to the execution subsystem, wherein the plurality of positions are indicative of a program order of the instructions concurrently dispatched into the plurality of positions.

5. The decode unit as recited in claim 4 wherein the circuitry is configured to dispatch the initial instruction into a last position of the plurality of positions, the last position being ordered subsequent to each other one of the plurality of positions.

6. The decode unit as recited in claim 5 wherein the circuitry is configured to dispatch the remaining instructions into other ones of the plurality of positions.

7. The decode unit as recited in claim 6 wherein the decode unit is coupled to receive a second plurality of instructions subsequent to the plurality of instructions, and wherein the circuitry is configured to dispatch at least a second initial instruction of the second plurality of instructions into one or more of the last positions concurrent with dispatching the remaining instructions.

8. The decode unit as recited in claim 4 wherein the circuitry is configured to dispatch a plurality of initial instructions from the first pipeline stage into a plurality of last positions of the plurality of positions.

9. The decode unit as recited in claim 1 wherein the plurality of instructions are variable length.

10. The decode unit as recited in claim 1 wherein the circuitry includes a first circuit operable on the initial instruction in a third stage of the plurality of pipeline stages, the first circuit configured to perform a first portion of decoding the initial instruction, and wherein the circuitry further includes a second circuit operable on the remaining instruction in a fourth pipeline stage of the plurality of pipeline stages, the fourth circuit configured to perform the first portion of decoding the remaining instruction.

11. A processor comprising:
a decode unit coupled to receive instruction bytes, wherein the decode unit comprises circuitry divided into a pipeline including a plurality of pipeline stages, the circuitry configured to concurrently initiate decode of a plurality of instructions having a program order with respect to each other, wherein the circuitry is configured to dispatch at least an initial instruction of the plurality of instructions from a first pipeline stage of the plurality of pipeline stages, and wherein the circuitry is configured to dispatch at least one remaining instruction of the plurality of instructions from a second pipeline stage of the plurality of pipeline stages, and wherein the second pipeline stage is subsequent to the first pipeline stage in the pipeline; and
an execution subsystem coupled to receive the initial instruction and the remaining instruction and configured to execute the initial instruction and the remaining instruction.

12. The processor as recited in claim 11 wherein the circuitry is configured to dispatch each remaining instruction of the plurality of instructions from the second pipeline stage.

13. The processor as recited in claim 12 wherein the second pipeline stage is a last stage of the pipeline.

14. A processor comprising:
a decode unit coupled to receive instruction bytes, wherein the decode unit comprises circuitry divided into a pipeline including a plurality of pipeline stages, the circuitry configured to concurrently initiate decode of a plurality of instructions, wherein the circuitry is configured to dispatch at least an initial instruction of the plurality of instructions from a first pipeline stage of the plurality of pipeline stages, and wherein the circuitry is configured to dispatch at least one remaining instruction of the plurality of instructions from a second pipeline stage of the plurality of pipeline stages, and wherein the second pipeline stage is subsequent to the first pipeline stage in the pipeline; and
an execution subsystem coupled to receive the initial instruction and the remaining instruction and configured to execute the initial instruction and the remaining instruction, and wherein the decode unit is configured to dispatch instructions into a plurality of positions input to the execution subsystem, wherein the plurality of positions are indicative, to the execution subsystem, of a program order of the instructions concurrently dispatched into the plurality of positions.

15. The processor as recited in claim 14 wherein the circuitry is configured to dispatch the initial instruction into a last position of the plurality of positions, the last position being ordered subsequent to each other one of the plurality of positions.

16. The processor as recited in claim 15 wherein the circuitry is configured to dispatch the remaining instructions into other ones of the plurality of positions.

17. The processor as recited in claim 16 wherein the decode unit is coupled to receive a second plurality of instructions subsequent to the plurality of instructions, and wherein the circuitry is configured to dispatch at least a second initial instruction of the second plurality of instructions into one or more of the last positions concurrent with dispatching the remaining instructions.

18. The processor as recited in claim 14 wherein the decode unit is configured to dispatch a plurality of initial instructions from the first pipeline stage into a plurality of last positions of the plurality of positions.

19. The processor as recited in claim 11 wherein the plurality of instructions are variable length.

20. The processor as recited in claim 11 wherein the circuitry includes a first circuit operable on the initial instruction in a third stage of the plurality of pipeline stages, the first circuit configured to perform a first portion of decoding the initial instruction, and wherein the circuitry further includes a second circuit operable on the remaining instruction in a fourth pipeline stage of the plurality of pipeline stages, the fourth circuit configured to perform the first portion of decoding the remaining instruction.

21. A decode unit coupled to receive instruction bytes, the decode unit coupled to dispatch instructions into a plurality of positions input to an execution subsystem, wherein the plurality of positions are indicative, to the execution subsystem, of a program order of instructions concurrently dispatched into the plurality of positions, wherein the decode unit is configured to concurrently initiate decode of a plurality of instructions, and wherein the decode unit is configured to decode one or more initial instructions of the plurality of instructions with a first decode latency and to dispatch the one or more initial instructions into one or more last positions of the plurality of positions, the last positions being ordered subsequent to each of the other positions of the plurality of positions, and wherein the decode unit is configured to decode at least one remaining instruction with a second decode latency and to dispatch the remaining instruction into a different one of the plurality of positions.

22. The decode unit as recited in claim 21 wherein the decode unit is coupled to concurrently receive a second plurality of instructions, and wherein the decode unit is configured to decode a second one or more initial instructions of the second plurality of instructions and to dispatch the second initial instructions into the one or more last position concurrently with dispatching the remaining instruction into the different one of the plurality of positions.

23. A computer system comprising:
- a processor comprising:
  - a decode unit coupled to receive instruction bytes, wherein the decode unit comprises circuitry divided into a pipeline including a plurality of pipeline stages, the circuitry configured to concurrently initiate decode of a plurality of instructions having a program order with respect to each other, wherein the circuitry is configured to dispatch at least an initial instruction of the plurality of instructions from a first pipeline stage of the plurality of pipeline stages, and wherein the circuitry is configured to dispatch at least one remaining instruction of the plurality of instructions from a second pipeline stage of the plurality of pipeline stages, and wherein the second pipeline stage is subsequent to the first pipeline stage in the pipeline; and
  - an execution subsystem coupled to receive the initial instruction and the remaining instruction and configured to execute the initial instruction and the remaining instruction; and
- a peripheral device configured to communicate between the computer system and another computer system.

24. The computer system as recited in claim 23 wherein the peripheral device comprises a modem.

25. The computer system as recited in claim 23 wherein the peripheral device comprises a network card.

26. The computer system as recited in claim 23 further comprising an audio device.

27. A method comprising:
- in a decode unit, concurrently initiating decode of a plurality of instructions having a program order with respect to each other, wherein the decode unit includes a pipeline divided into a plurality of pipeline stages;
- the decode unit dispatching at least an initial instruction of the plurality of instructions from a first pipeline stage of the plurality of pipeline stages; and
- the decode unit dispatching at least one remaining instruction of the plurality of instructions from a second pipeline stage of the plurality of pipeline stages, and wherein the second pipeline stage is subsequent to the first pipeline stage in the pipeline.

28. The method as recited in claim 27 wherein the dispatching is into a plurality of positions input to the execution subsystem, wherein the plurality of positions are indicative of a program order of the instructions concurrently dispatched into the plurality of positions.

29. The method as recited in claim 28 wherein dispatching the initial instruction comprises dispatching into a last position of the plurality of positions, the last position being ordered subsequent to each other one of the plurality of positions.

30. The method as recited in claim 29 wherein dispatch the remaining instruction comprises dispatching into another one of the plurality of positions.

31. The method as recited in claim 30 further comprising
- the decode unit receiving a second plurality of instructions subsequent to the plurality of instructions; and
- the decode unit dispatching at least a second initial instruction of the second plurality of instructions into one or more of the last positions concurrent with dispatching the remaining instruction.

\* \* \* \* \*

UNITED STATES PATENT AND TRADEMARK OFFICE
CERTIFICATE OF CORRECTION

PATENT NO. : 6,844,831 B1
DATED : January 18, 2005
INVENTOR(S) : S. Craig Nelson It is certified that error appears in the above-identified patent and that said Letters Patent is hereby corrected as shown below:

Column 13,
Line 11, please delete "stare" and insert -- stage -- in place thereof.

Signed and Sealed this

Third Day of May, 2005

JON W. DUDAS
*Director of the United States Patent and Trademark Office*